April 6, 1954  E. VAN DER PYL  2,674,008
MOLDING MECHANISM
Filed April 11, 1951  10 Sheets-Sheet 1

Inventor
EDWARD VAN DER PYL
By George Crompton
Attorney

April 6, 1954

E. VAN DER PYL 2,674,008

MOLDING MECHANISM

Filed April 11, 1951

Inventor
EDWARD VAN DER PYL
By George Crompton
Attorney

April 6, 1954  E. VAN DER PYL  2,674,008
MOLDING MECHANISM
Filed April 11, 1951  10 Sheets-Sheet 5
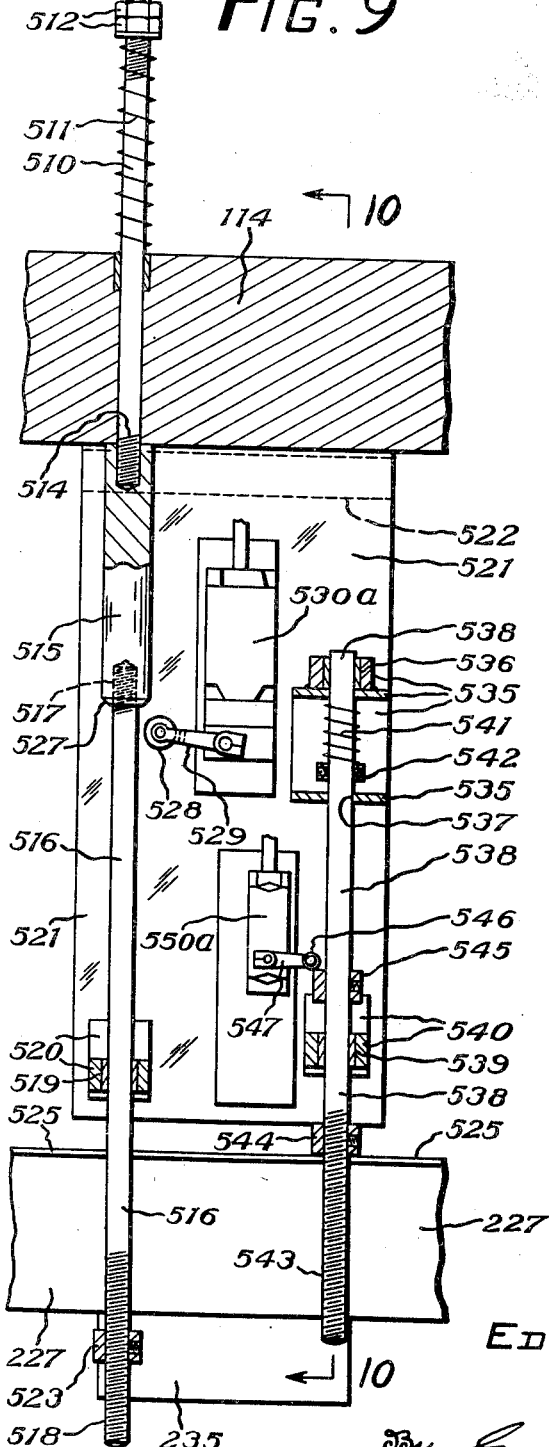
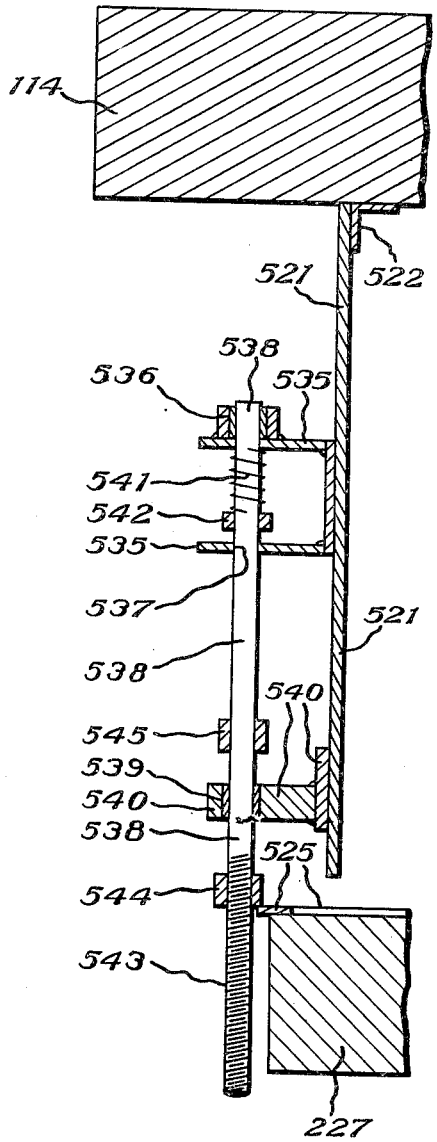
Inventor
EDWARD VAN DER PYL
By George Crompton Jr. Attorney April 6, 1954 E. VAN DER PYL 2,674,008
MOLDING MECHANISM
Filed April 11, 1951 10 Sheets-Sheet 6
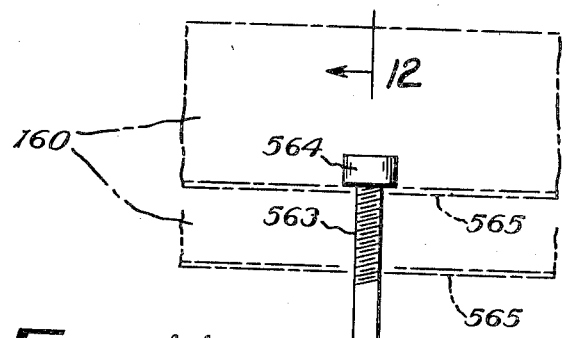
FIG. 11
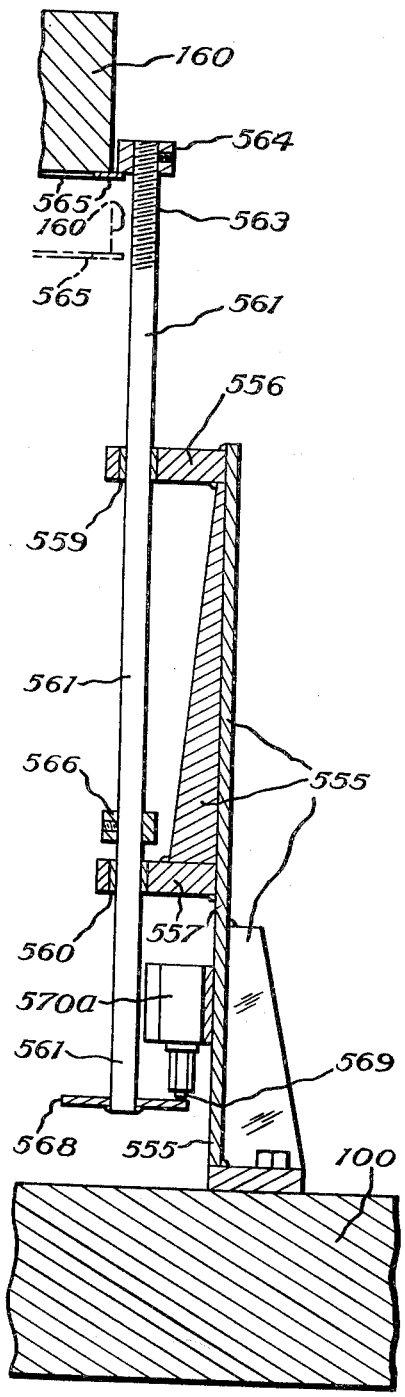
FIG. 12
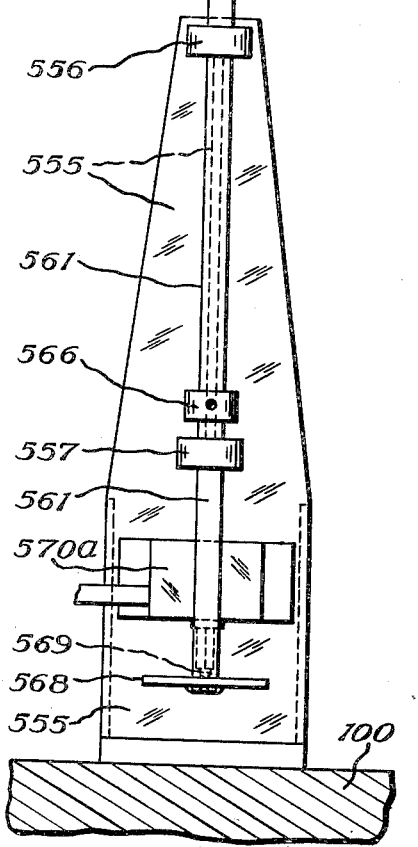
Inventor
EDWARD VAN DER PYL
By George C. Compton Jr. Attorney

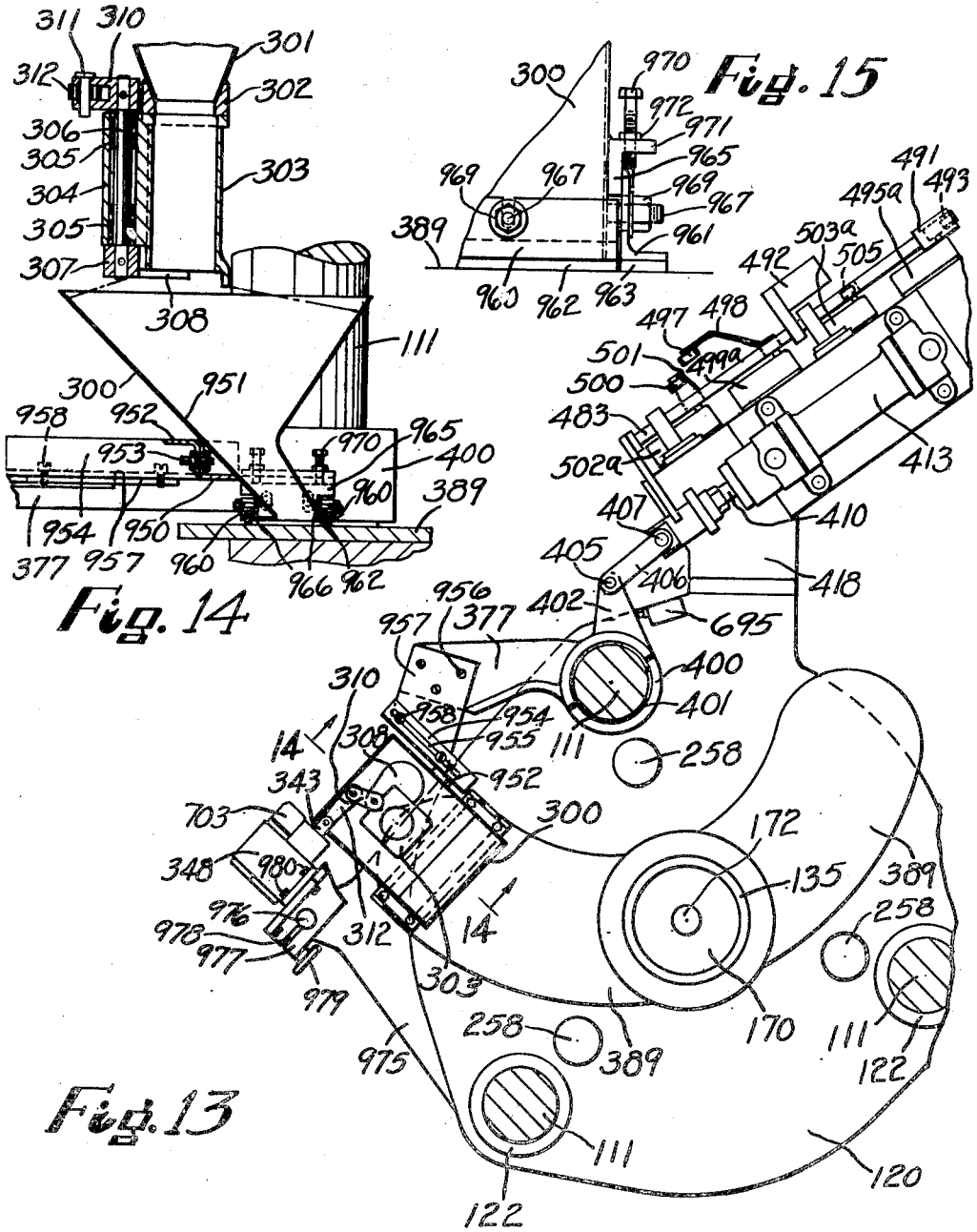

April 6, 1954     E. VAN DER PYL     2,674,008
MOLDING MECHANISM
Filed April 11, 1951     10 Sheets-Sheet 8
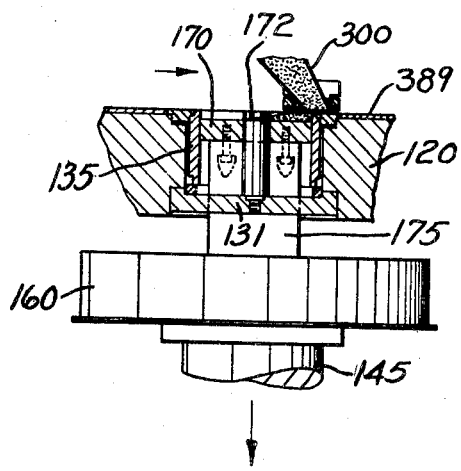
Fig. 16
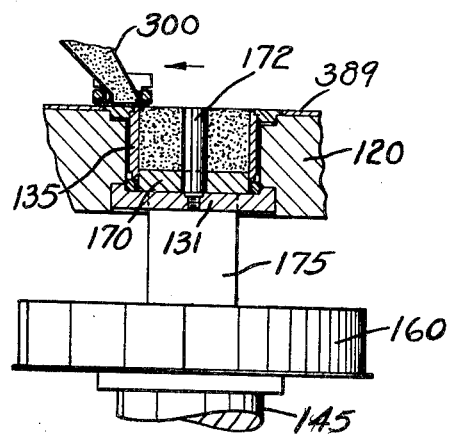
Fig. 17
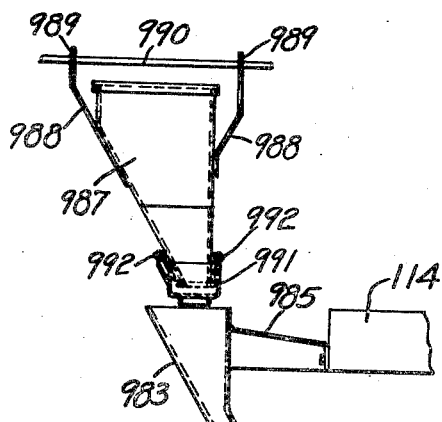
Fig. 19
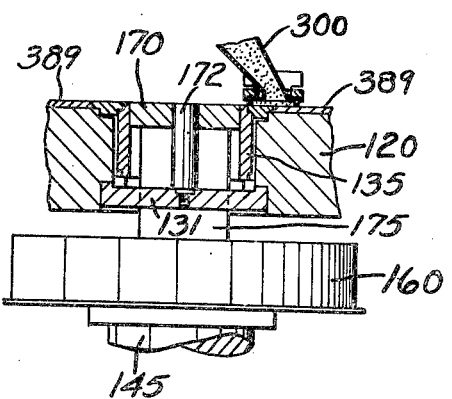
Fig. 18
Inventor
EDWARD VAN DER PYL
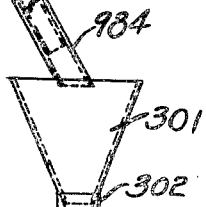
By George Crompton
Attorney

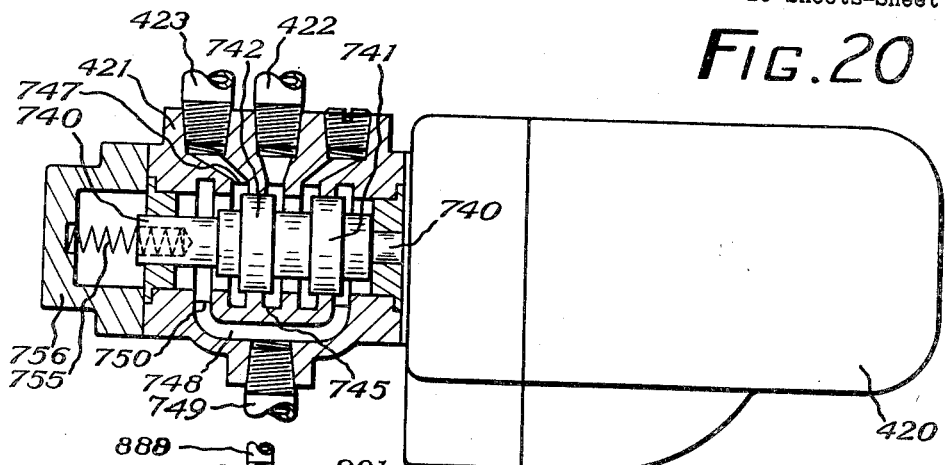

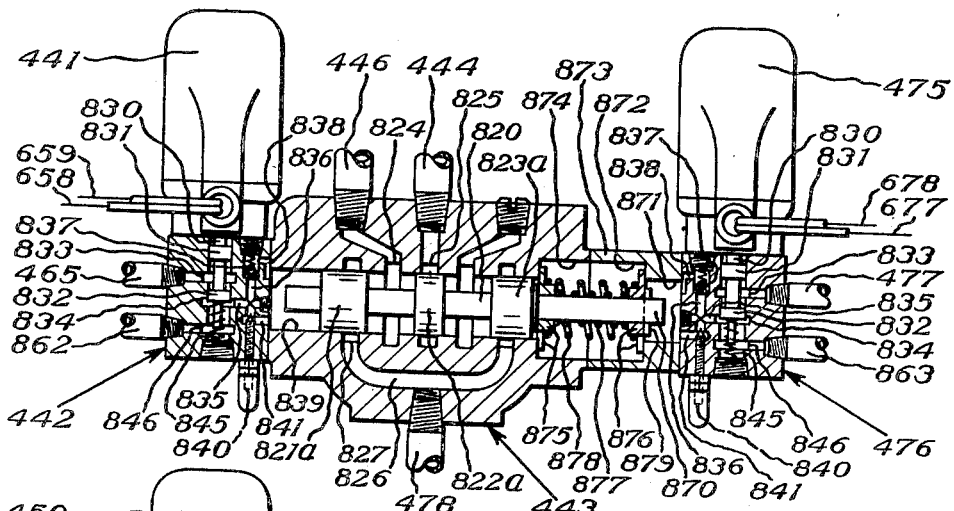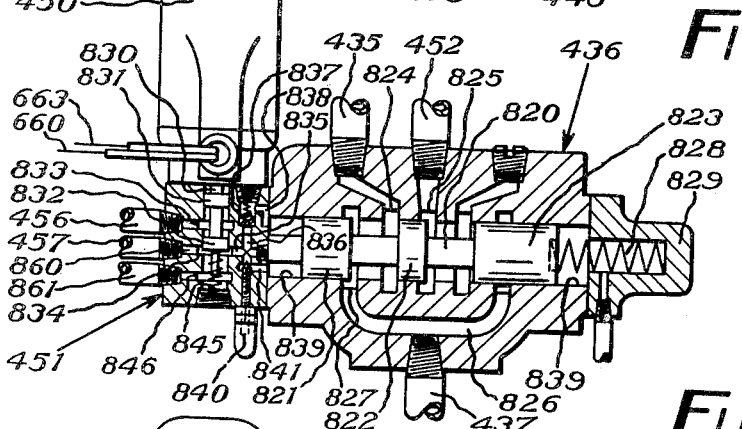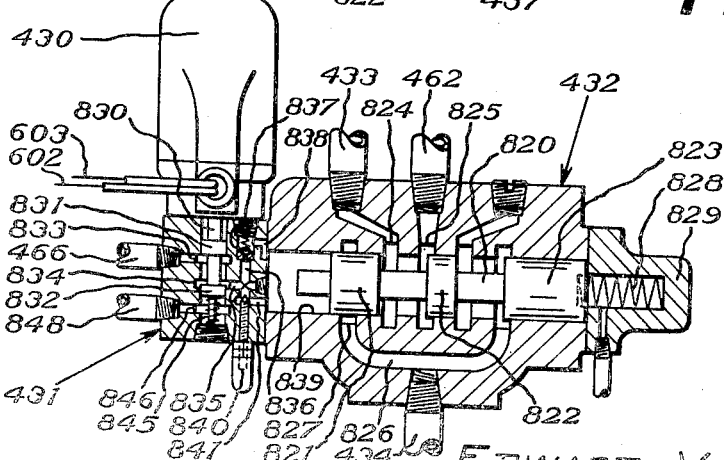

Patented Apr. 6, 1954

2,674,008

UNITED STATES PATENT OFFICE 2,674,008

MOLDING MECHANISM

Edward Van der Pyl, Holden, Mass., assignor to Norton Company, Worcester, Mass., a corporation of Massachusetts Application April 11, 1951, Serial No. 220,475

8 Claims. (Cl. 18—16)

1

The invention relates to molding mechanism particularly for the molding of grinding wheels, especially medium or large sizes of grinding wheels.

One object of the invention is to provide automatically operating mechanism to fill a mold and evenly to distribute the material to be molded therein. Another object of the invention is to provide a continuously acting mechanism producing grinding wheels in a "green" state of uniform density throughout. Another object of the invention is to provide a mechanism for charging the mold in an automatic press whereby to obtain well molded grinding wheels with very few or no defective ones, in the course of production of scores or even hundreds thereof. Another object of the invention is to provide a mechanism which will successfully make very perfect grinding wheels of large size in a very minimum of time for the manufacture of dozens, scores or hundreds of wheels.

Other objects will be in part obvious or in part pointed out hereinafter.

In the accompanying drawings in which is shown one of many possible embodiments of the mechanical features of this invention, Figure 1 is a front elevation, certain parts being shown in section, of a molding press with which the mechanism of the invention is used and certain parts of which constitute part of the mechanism of this invention, Figure 2 is an hydraulic diagram showing a solenoid and valves and a piston and cylinder unit for actuation of a mold charging box, and a wiring diagram, Figure 3 is a cross-sectional view of a piston and cylinder unit for the actuation of a hopper gate, illustrating also pneumatic connections, and a wiring diagram, Figure 4 is an hydraulic diagram illustrating various solenoids, valves and pipe connections for the automatic operation of the press of Figure 1 which is an hydraulic press, Figure 5 is a wiring diagram, Figure 6 is an elevation of a piston and cylinder unit and connections to operate the charging box, Figure 7 is a sectional view taken on the line 7—7 of Figure 6, Figure 8 is a sectional view taken on the line 8—8 of Figure 6, Figure 9 is a view partly in elevation and partly in section of an adjustable controlling mechanism located at the upper part of the press, Figure 10 is a sectional view taken on the line 10—10 of Figure 9,

2

Figure 11 is an elevation of a control located near the bottom of the press,

Figure 12 is a sectional view taken on the line 12—12 of Figure 11,

Figure 13 is a plan view of the charging box and the hopper gate and actuating mechanisms therefor, Figure 14 is a sectional view taken on the line 14—14 of Figure 13, Figure 15 is an enlarged fragmentary detail of the bottom of the charging box, Figure 16 is an enlarged fragmentary view partly in section and partly in elevation of the mold and the bottom of the charging box at a particular instant during the mold filling, Figure 17 is a view similar to Figure 16 showing the parts immediately after the mold has been filled, Figure 18 is a view similar to Figure 16 but illustrating the action when certain adjustments are changed so that the mold bottom plate does not descend until the charging box has moved over it, Figure 19 is a side elevation of a system of hoppers whereby to supply the apparatus with the material to be molded, Figures 20 to 27 inclusive are detailed cross-sectional views of various valves and other fluid pressure apparatus.

Many of the parts and mechanisms herein illustrated and described are illustrated and described in some cases more fully in a copending application Serial No. 30,174, filed May 29, 1948. So far as possible the numerology of this application is the same as that of the aforesaid copending application.

Figure 1:
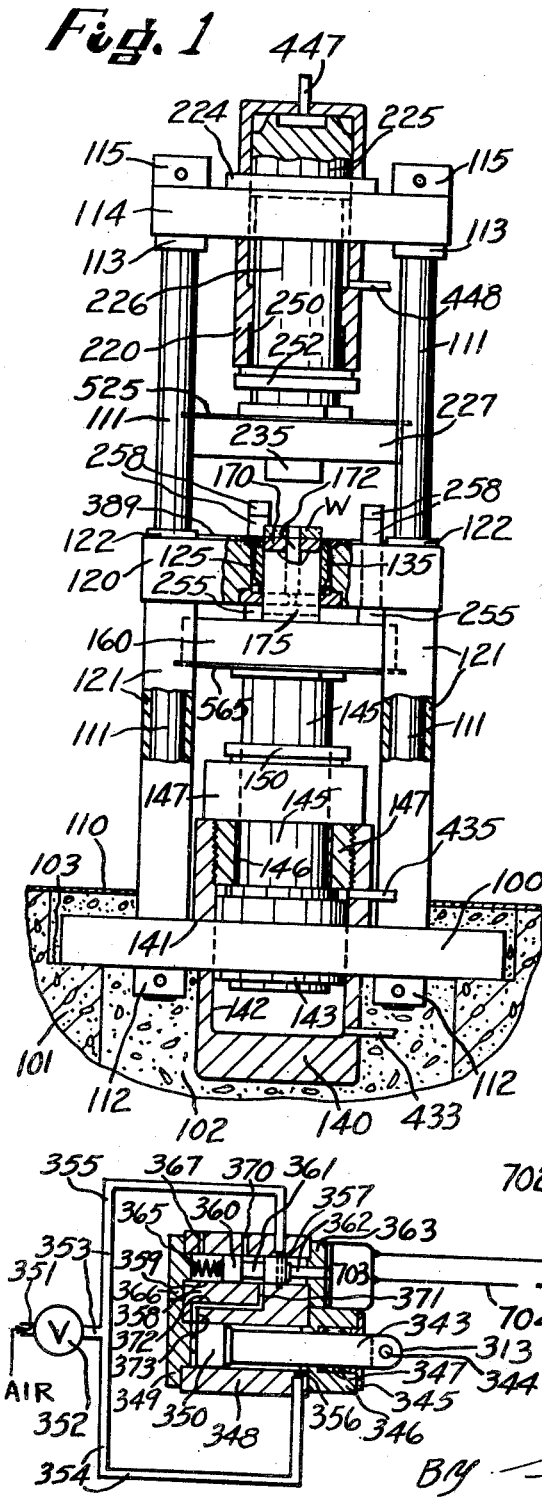

Referring first to Figure 1, the press comprises a massive bed plate 100 which rests upon a concrete foundation 101 having a well 102 with a shoulder 103. An annular cover plate 110 may be provided for the well 102 to keep dirt and tools out of the well and to provide a footing for the operator.

Extending through the bed plate 100 are a plurality of massive rods 111, three being a preferred number. These rods 111 are threaded at the bottom and fitted with nuts 112 under the bed plate 100. The rods 111 near their upper ends have collars 113 secured thereto and the rods extend through a massive cap 114 which is supported by the collars 113. The rods 111 are also threaded at the top and fitted with nuts 115 above the cap 114. The rods 111 with the nuts 112 and 115 thus hold the bed plate 100 and the cap 114 from moving apart under the reactive force developed in operating the press.

Between the bed plate 100 and the cap 114 is a massive mold table 120 through which the rods 111 extend and in which the pressing is done. This mold table 120 rests on sleeves 121 surrounding the rods 111 and extending to the bed plate 100. On the upper side the table is held down by collars 122 on the rods 111.

Still referring to Figure 1, the mold table 120 has extending therethrough a large cylindrical bore 125 in which is secured a mold band 135. I shall not herein describe the details of the mounting of the mold band 135 nor of the manner in which the arbor 172 is supported in the mold since these features are thoroughly described in the aforesaid copending application and the present invention is not concerned with the details.

Still referring to Figure 1, extending through the bed plate 100 is a large cylinder 140 having a circumferential shoulder 141 resting on top of the bed plate 100. This cylinder 140 has an internal cylindrical bore 142 in which fits a large piston 143 having integral therewith a massive ram 145. The ram 145 fits in packing 146 which is located in a cylinder head 147 which is located in the upper end of the cylinder 140 in screw threaded engagement therewith. At the upper end of the packing 146 is a collar 150 holding the packing 146 in place, the collar 150 being secured to the head 147 by screws, not shown. This packing 146 constitutes a stuffing box to keep the fluid from escaping. Mounted on and secured to the ram 145 is a ram head 160, which is a massive circular plate. In the mold band 135 is a mold bottom plate 170 having a central hole to receive the arbor 172. This mold bottom plate 170 is removably secured to a pair of steel columns 175. One of these steel columns is illustrated in Figure 1 and the other thereof is illustrated in Figures 16 and 17; they are located on either side of a diametral member 131 (Figures 16 and 17) which supports the arbor 172. These columns 175 are secured, in a manner fully described in the aforesaid copending application, to the ram head 160.

Referring again to Figure 1, supported by the cap 114 is a large upper cylinder 220 which is coaxial with the cylinder 140. The cap 114 has a vertical bore in which the cylinder 220 fits and the cylinder 220 has a shoulder abutting the under side of the cap 114 to take the thrust of many tons when the press is operating. A nut 224 in screw threaded engagement with the cylinder 220 engages the upper side of the cap 114 and holds the cylinder 220 from falling.

In the cylinder 220 is a piston 225 operating a ram 226 to the bottom of which is attached a ram head 227 which is likewise a massive circular plate. To the under side of the ram head 227 is detachably secured a mold top plate 235 having a central axial bore into which the arbor 172 may extend during the molding operation. In order to guide the ram 226 in the cylinder 220 and to form a stuffing box so that the fluid under pressure which lifts the piston 225 shall not escape, heavy packing 250 is provided in the cylinder 220 and around the ram 226, the packing 250 being held in place by means of a collar 252 secured to the cylinder 220 by means of bolts, not shown.

Still referring to Figure 1, secured to the top of the ram head 160 are a plurality (preferably three) of blocks 255 upon each of which are mounted a plurality of cylindrical posts 258 in piled relation. For the purpose of adjusting the apparatus for the manufacture of grinding wheels of different thicknesses one or more posts 258 can be removed from each pile of posts or one or more posts 258 can be added to each pile of posts. Thus collectively the piles of posts 258 constitute gauging means to determine the lower position of the upper ram head 227, whereas the blocks 225 constitute gauging means to determine the upper position of the lower ram head 160. Blocks 255 of different heights can be used for the manufacture of grinding wheels of different thicknesses. The blocks 255 are larger in diameter than the posts 258 and the latter extend through bores in the table 120 which barely clear the posts 258 so that the blocks 255 can engage the under side of the table 120.

Referring now to Figures 13 and 14, I provide a charging box 300 the shape and movement of which relative to the mold plate 170 is one of the features of this invention. However, the construction and shape of this charging box will be hereinafter described. A hopper 301, only a portion of which is shown in Figure 14, contains a supply of particles which collectively constitute a free-flowing dry granular mix. For the manufacture of grinding wheels each particle may consist of an abrasive granule coated with an envelope of bond of particle size very much smaller than that of the abrasive granules and preferably mixed with wax. The apparatus of this invention can be used automatically to mold vitrified grinding wheels or on the other hand it can be used automatically to mold resinoid bonded grinding wheels. For an illustrative embodiment of the kind of mix which this apparatus is capable of handling, see U. S. Letters Patent No. 2,534,128, granted December 12, 1950, on application of Wallace L. Howe.

The hopper 301 is shown as supported by a ring 302 having a countersunk portion to receive the hopper; connected to and depending from the ring 302 is a tube 303 having an integral boss 304 extending from one side thereof, the boss 304 having a vertical bore therethrough, receiving bearings 305 journalling a vertical shaft 306. Pinned to the bottom of the shaft 306 is the hub 307 of a gate 308 in the shape of a disc, which in one position closes the bottom of the tube 303 and in another position opens it.

Pinned to the top of the shaft 306 is a forked arm 310 connected by a pin 311 to a link 312 the other end of which is connected to a clevis 313 on the end of a piston rod 343 by means of a pin 344.

Figure 3:
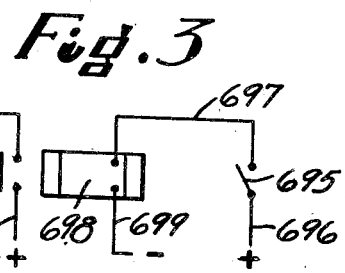

Referring now to Figure 3, the piston rod 343 extends through a stuffing box nut 345 and through a stuffing box head 346 having packing 347 into a cylinder 348 having at the other end a head 349. In the cylinder 348 on the piston rod 343 is a piston 350. A source of air under pressure is connected by a pipe 351 having a hand valve 352 to a T union 353 to which are connected hoses 354 and 355. The hose 354 is connected to a port 356 extending through one end of the cylinder 348 as shown. The hose 355 is connected to a port 357 in a valve casing 358 which may be integral with the cylinder 348.

Extending the length of the valve casing 358 is a cylindrical valve chamber 359 in which is a valve piston 360 with a reduced diameter portion 361. The valve piston 360 has a piston rod 362 which extends through a head 363 blocking one end of the valve chamber 359. Contacting the other end of the valve piston 360 is a spring 365 which is held in the chamber 359 by a head 366 blocking the other end of the chamber 359. A port 367 extends into the chamber 359 where the spring 365 is located, thus to prevent entrapped air from blocking movement of the piston valve 360. When the piston valve 360 is in the position illustrated in Figure 3, the reduced portion 361 connects a port 370, leading to the outside air, to a port 371 in the casing 358 which is connected to a long passage 372 and then to a port 373 extending to the inside of the cylinder 348 adjacent the head 349. This drops the pressure in the cylinder 348 adjacent the head 349 to atmospheric but at all times when the valve 352 is open (this is merely a hand shut-off valve) the port 357 is connected to pressure. Therefore the piston 350 is held by the air under pressure from the line in the position shown in Figure 3 holding the gate 308 in the open position. But when the piston valve 360 under the influence of the spring 365 moves to carry the reduced portion 361 into registry with the port 357, at this time also closing the port 370, air under pressure goes from hose 355 through port 357 by reduced portion 361 through port 371 through passage 372 through port 373 into the cylinder 348 adjacent the head 349 and this forces the piston 350 in the direction of the stuffing box 346 thus moving the arm 310 and closing the gate 308.

Referring now to Figure 13, an arm 377 is connected to the charging box 300 and the details of the connection will be hereinafter described. The charging box 300 is, by the mechanism about to be described, moved in an arc over a wear plate 389 located on top of the table 120, and in Figure 16 it will be noted that the top of the mold band 135 is flush with the top of the wear plate 389.

Figure 6:
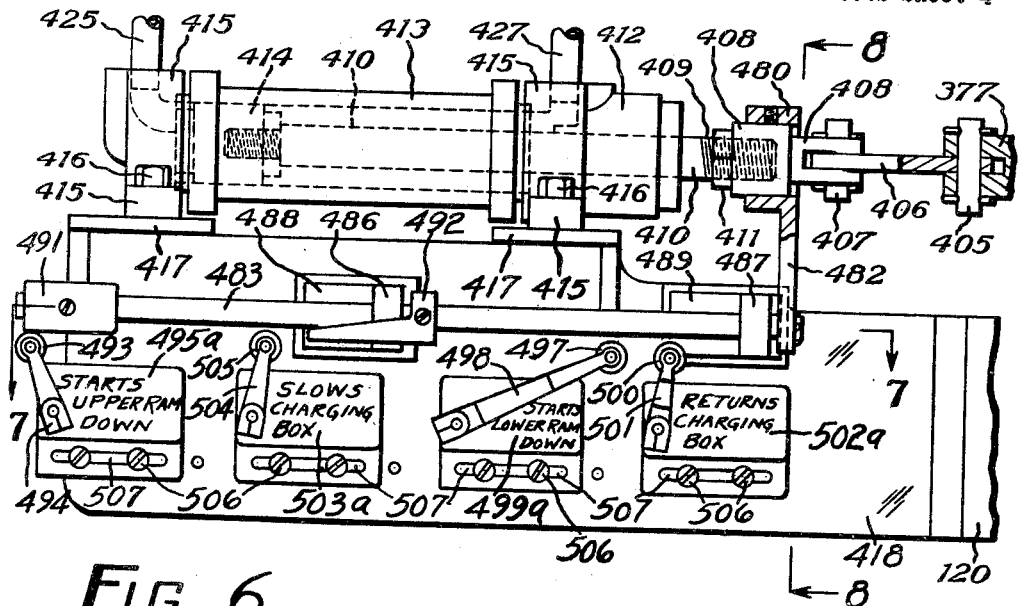

The arm 377 has a split hub 400 one part of which is integral with the arm 377 and the other part of which is bolted to the first part by bolts not shown. This split hub 400 is located on a split sleeve 401 surrounding one of the rods 111 and the hub 400 is supported by one of the collars 122. Also connected to the hub 400 is an arm 402 which is connected by a pin 405 to a link 406. Referring now especially to Figure 6, the link 406 is connected by a pin 407 to a clevis head 408 which is internally screw threaded to receive a screw threaded end 409 of a piston rod 410. A nut 411 holds these parts together. The piston rod 410 extends through a cylinder head 412 into a cylinder 413 where the piston rod 410 has a piston 414. Fluid under pressure, preferably hydraulic fluid such as oil, is admitted alternately to opposite ends of the cylinder 413 to move the arm 377 and thereby to move the charging box 300 from one position to the other. The cylinder 413 is secured in position by means of clamps 415 secured by bolts 416 to portions 417 of an extension 418 bolted to the mold table 120. In this connection the operating parts to charge the mold are omitted from Figure 1 more clearly to show the basic structure of the press as the relationship of the mold charging mechanism to the portions of the press is well illustrated in Figure 13.

When the press is idle the charging box 300 is under the gate 308 and the charging box contains a mixture of abrasive and bond ready to be molded into a grinding wheel because the gate 308 is open. Incidentally while a grinding wheel mixture flows it doesn't flow exactly like water no matter how free flowing it may be. It has an angle of repose and consequently there is nothing incompatible with showing the gate 308 above the top level of the charging box 300 since the dry granular mix will come to rest to form a top more or less as indicated by the dot-dash lines in Figure 14. Thus there is no danger of overflowing the charging box 300 and this fact has been proven in actual practice.

With the charging box 300 under the gate 308 the upper ram 226 is in its uppermost position and the lower ram 145 is likewise in its uppermost position, both as shown in Figure 1. When the operator starts the machine to operate automatically, electrical mechanism, which will hereinafter be described, energizes a solenoid 420 (see now Figure 2), which operates a valve 421, which admits fluid under pressure from a low pressure line 422 into a pipe 423 which is connected to a flow controlling valve 424 the other side of which is connected by a pipe 425 to the left-hand side (Figure 6) of the cylinder 413. The right-hand side of the cylinder 413 is always connected to the low pressure line 422 by means of a pipe 427. The piston 414 moves to the right, Figure 6, whenever the pressure is exerted against its left-hand side because the area of the piston rod 410 reduces the effective area of the piston 414 on the right-hand side. Thus the charging box 300 moves in a counter-clockwise direction, Figure 13, to carry the charge of dry granular mix to a position above the mold band 135 when the solenoid 420 is energized.

Figure 4:
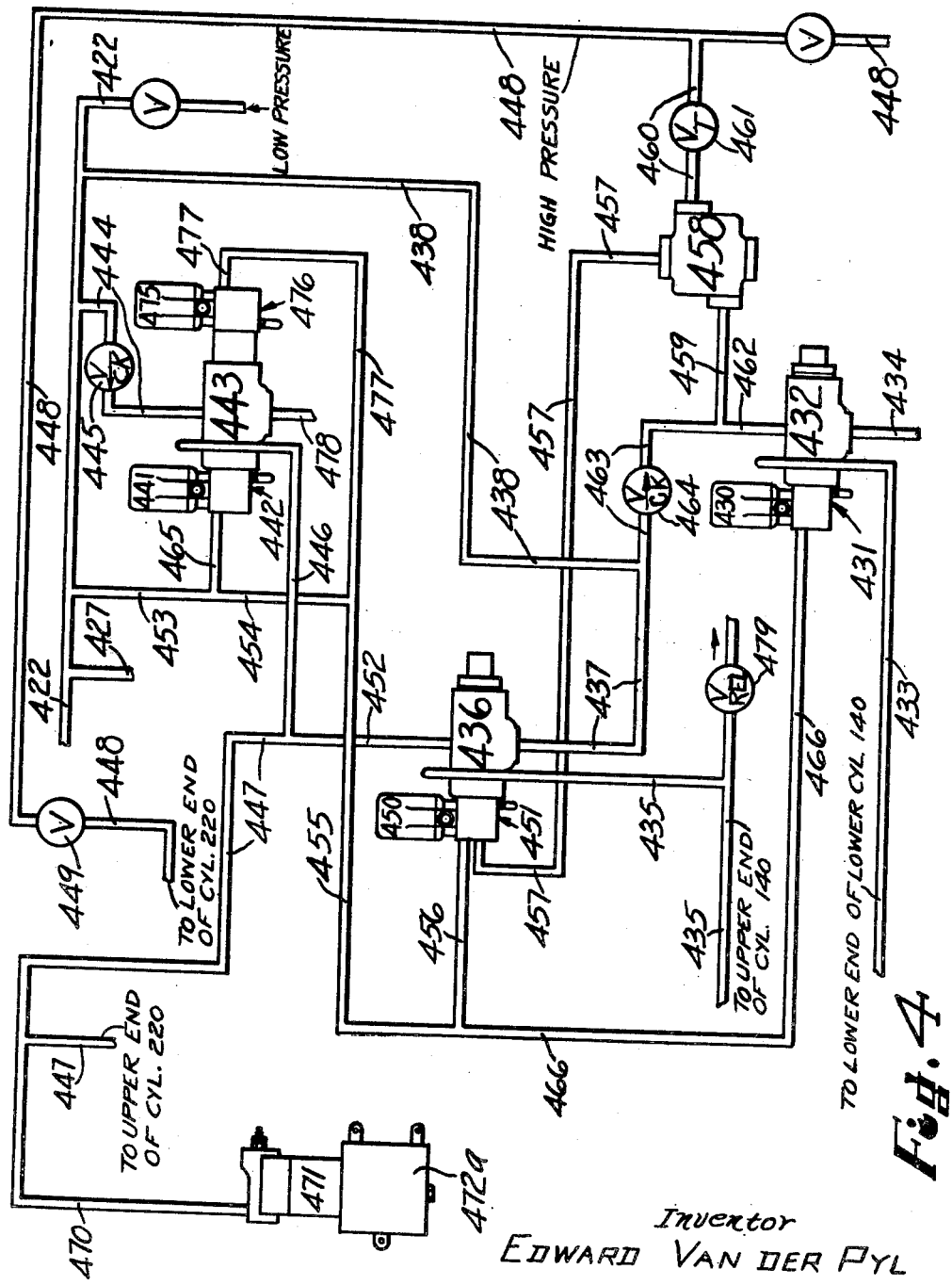

Referring to Figures 1 and 4, when a solenoid 430 is deenergized the ram 145 moves downwardly carrying down the plate 170. This action takes place because the deenergization of the solenoid 430 operates a pilot valve 431 which moves a valve 432 allowing fluid from the bottom of the cylinder 140 to exhaust by way of a pipe 433 through the valve 432 and then by way of a pipe 434 to a supply tank. The limited area of the upper side of the piston 143 is at this time under low pressure by way of a pipe 435 which is connected to a valve 436 which at this time connects the pipe 435 to a pipe 437 which branches into a pipe 438 which leads to the low pressure supply pipe 422.

Thereafter a solenoid 441 is energized which actuates a pilot valve 442 which moves a valve 443 to admit fluid under low pressure from the line 422 through a pipe 444 having a check valve 445 and into a pipe 446 which leads to a pipe 447 which leads to the upper end of the cylinder 220. The limited area of the underside of the piston 225 is always under high pressure by way of a high pressure line 448 having a needle valve 449.

The pressure in the low pressure line 422 may be for example 300 pounds to the square inch and the pressure in the line 448 may be for example 2500 pounds to the square inch. However so much greater is the area of the piston 225 than the area thereof minus the ram 226 that the lower pressure prevails over the high pressure and of course the considerable weight of the parts is also acting to move them downwardly. The action however forces the high pressure fluid back into the line 448 and the fluid must travel through the needle valve 449 so therefore the speed of downward movement can readily be controlled by means of the needle valve 449.

At a time in the cycle of operation which is adjustable but which is generally at the moment when the top mold plate 235 enters the mold band 135, the lower ram 145 is caused to move upwardly while the upper ram 226 continues to move downwardly; ultimately both motions are stopped by the contacting of the posts 258 with the ram head 227 as already indicated. The motion of the two rams towards each other is at first under low pressure and the low pressure line 442 transmits fluid in large volume per unit of time. Eventually, however, when back pressure is built up by the resistance of the material being molded, the pressure automatically rises and both rams are thereafter forced towards each other by the full pressure of the line 448. The transfer of actuation from the low pressure line 422 to the high pressure line 448 is not only automatic but takes place without any further shifting of valves. This control gives the double advantage of rapid movement in the early stages and high pressure in the later stages in order to compact the material into a strong article. Furthermore, it is achieved with economy of the high pressure fluid. These actions take place as follows.

At the instant hereinbefore indicated, namely when the mold top plate 235 entered the mold band 135 or just before or just after this event, the solenoid 441 was deenergized, the solenoid 430 was energized and a solenoid 450 was energized. Deenergization of the solenoid 441 shifts the pilot valve 442 to move the valve 443 to disconnect pipes 444 and 446. Energization of the solenoid 450 shifts a pilot valve 451 which shifts the valve 436 to connect the pipe 435 to a pipe 452 which is connected to the pipe 447. At the same time the shifting of the valve 436 shuts off the pipe 435 from the pipe 437. Thus the upper end of the cylinder 140 is now connected to the upper end of the cylinder 220. At the same time the pilot valve 451 itself connects a series of pipes 453, 454, 455 and 456 to a pipe 457 running to a valve 458. The pipe 453 comes out of the low pressure line 422 and thus fluid under low pressure is admitted to the valve 458. This valve 458 is opened when the fluid under low pressure is admitted through the pipe 457 thereby to connect pipes 459 and 460. In the pipe 460 is a throttle valve 461 and the pipe 466 is connected to the high pressure line 448. The pipe 459 is connected to a pipe 462 and when the solenoid 430 was energized, the pilot valve 431 was operated to shift the valve 432 to connect the pipe 462 with the pipe 433. However, the pipe 438 leading from the low pressure line 422 is connected by means of pipe 463 with the pipe 462, there being a check valve 464 in the pipe 463. Now it will be seen that both high and low pressures are connected to the bottom of the cylinder 140 but the high pressure will not enter the main low pressure line 422 because the check valve 464 prevents it from so doing, and furthermore, the high pressure fluid will not at first take control of the operation because its flow is restricted by the throttle valve 461. However, when the low pressure can no longer do the job, the high pressure will. And as the ram 145 moves upwardly, the ram 226 moves downwardly at the same rate since fluid is forced by the piston 143 through the pipe 435 to the pipe 452 to the pipe 447 to the upper end of the cylinder 220.

For supplying fluid to the pilot valve 442 there is a pipe 465 connecting the pilot valve 442 to the pipe 453 which is connected to the low pressure line 422. For supplying fluid to the pilot valve 431 there is a pipe 466 connected to the pipe 455 which through pipes 454 and 453 is connected to the low pressure line 422.

When movement of the rams 145 and 226 towards each other is stopped by the contact of the blocks 258 with the ram head 227, pressure is built up in the system and is carried by a pipe 470 to a piston-cylinder unit 471 which under this extremely high pressure actuates a switch 472 in a switch box 472a. This causes deenergization of the solenoid 450 and energizes a solenoid 475. This action moves the pilot valve 451 which moves the valve 436 again to connect the pipe 435 to the pipe 437 and at the same time cuts off the pressure to the pipe 457 thus shifting the valve 458 to disconnect the pipes 459 and 460. Energization of the solenoid 475 operates a pilot valve 476 to shift the valve 443 to connect the pipe 446 to an exhaust pipe 478. Fluid to supply the pilot valve 476 comes from pipe 454 by way of a pipe 477. Now the high pressure from the line 448 through the valve 449 can move upwardly the ram 226 and the fluid will exhaust through the pipes 447 and 446 to the exhaust pipe 478 as the piston 225 moves upwardly. At the same time high pressure has been disconnected from the bottom of the cylinder 140 but the low pressure from the line 422 via the pipe 438, pipe 433, pipe 462 and pipe 433 enters the lower end of the cylinder 140 to continue the upward movement of the ram 145 thus carrying the pressed grinding wheel W out of the mold ring 135. The bottom mold plate 170 is stopped right on the level of the plate 389 by the blocks 255 coming in contact with the table 120, but the ram 226 continues to rise to carry the mold top plate 235 well up out of the path of the charging box 300 when it returns during the succeeding cycle of operation. The press has now completed one cycle. The cycle immediately repeats since the solenoid 420 is reenergized as will be hereinafter explained.

Out of precaution I have provided a relief valve 479 connected to the pipe 435 so that in case the piston-cylinder unit 471 is set to operate at a dangerous high pressure, the relief valve 479 will operate to save the apparatus from a smash. This relief valve 479 is therefore in the nature of a safety valve and the molding press is operable without it. Naturally the valve 479 should be set to open at a higher pressure than that at which the unit 471 is expected to operate.

The automatic cycle of operation of the molding press is controlled by various limit switches and relays which operate the various solenoids above mentioned. These limit switches are operated mechanically by movement of the various parts. Such mechanisms are shown in Figures 2 and 5 to 12 inclusive. Referring now to Figures 2, 5, 6, 7 and 8, surrounding and secured to the clevis head 408 is a hub 480 having an arm 482 which is secured to a rod 483 that is slidable in bearings 484 and 485 in brackets 486 and 487 on plates 488 and 489 secured to the extension 418. On the rod 483 are dogs 491 and 492 which can be secured in adjusted position thereon. When the charging box 300 is under the gate 308, the piston 414 is to the left as shown in Figure 6, and the dog 491 is in contact with the roller 493 of a switch arm 494 of a limit switch 495 in a box 495a. When the charging box 300 moves to a position over the mold band 135, the actuating piston 414 has moved to the right, Figure 6, and the dog 492 contacts the roller 497 on a switch arm 498 of a limit switch 499 in a box 499a. The dog 492 moves beyond the roller 497 and eventually engages a roller 500 on a switch arm 501 of a switch 502 in a switch 502a, and it is this action which stops the inward motion of the charging box 300 and starts it moving outwardly again towards the gate 308. I provide a fourth switch box 503a having therein a switch 503 actuated by an arm 504 having a roller 505 which is depressed by the dog 491, which is a long dog and never goes beyond the roller 505 to the right thereof. These boxes 495a, 499a, 502a and 503a are adjustably secured to the face of the extension 418 by screws 506 in slots 507 in the boxes.

Referring now to Figures 9 and 10, extending through the cap 114 is a long bolt 510 surrounded by a spring 511 which bears at one end upon the top of the cap 114 and at the other end against nuts 512 adjustably positioned on a threaded end 513 of the bolt 510. The bolt 510 is likewise threaded at its lower end 514 and is thereby secured to a shaft 515 which is secured to a long bolt 516 having an upper threaded end 517 and a lower threaded end 518. The bolt 516 is slidable in a bearing 519 in a bracket 520 secured to a heavy sheet metal panel 521 which is secured to the under side of the cap 114 as by means of an angle iron 522 and a welding operation. The bolt 510 is slidable in the cap 114 and it will be seen that the entire assemblage of bolt 510, shaft 515 and bolt 516 can move downwardly from the position shown in Figure 9, crushing the spring 511, but this assembly cannot move upward beyond the position shown in Figure 9.

Upon the threaded end 518 of the long bolt 516 is a dog 523 in the form of a nut which can be secured in any position of adjustment. Secured to the upper side of the upper ram head 227 is a flat ring 525 which projects beyond the periphery of the ram head 227 as clearly shown in Figure 10. When the ram head moves to its lowermost position, the flat ring 525 contacts the dog 523 and moves the assembly of bolt 516, shaft 515 and bolt 510 downwardly. The shaft 515 has a beveled shoulder 527 which will then contact a roller 528 on a switch arm 529 of a limit switch 530 (Figure 5) in a box 530a.

Still referring to Figures 9 and 10, mounted upon the panel 521 is a U-shaped bracket 535 supporting a bearing 536 on one leg of the U and having a hole 537 on the other leg of the U, through which bearing and hole passes a rod 538 which is movable vertically. The rod 538 likewise passes through a bearing 539 in a bracket 540 secured to the panel 521. A spring 541 around the rod 538 between the legs of the U-shaped bracket 535 contacts a collar 542 fastened to the rod 538 and tends to keep the rod 538 at a low position but can be crushed to permit the rod 538 to move upwardly. The lower end of the rod 538 is threaded as shown at 543 and adjustably located on this threaded end is a nut 544. When the upper ram head 227 is in its upper position, the flat ring 525 is in engagement with the nut 544 and has raised the rod 538 bringing an adjustable collar 545 thereon into engagement with a roller 546 on a switch arm 547 of a limit switch 550 (Figure 5) in a switch box 550a.

Referring now to Figures 11 and 12, secured to the bed plate 100 is a bracket 555 having a pair of bearing arms 556 and 557 supporting bearings 559 and 560 through which extends a rod 561. This rod 561 is, like the rod 538 and the combination of bolts 510 and 516 with the shaft 515, movable vertically. In the case of the rod 561 gravity is relied upon to keep it in a downward position. It has an upper threaded end 563 having thereon an adjustable nut 564 in the path of a flat ring 565 like the ring 525, this ring 565 being secured to the under side of the lower ram head 160 and projecting outwardly from the periphery thereof. Accordingly, when the lower ram head rises, the ring 565 will engage the nut 564 and raise the rod 561. The lower position of the rod 561 is limited by a collar 566 adjustably secured thereto which will contact the arm 557. To the bottom of the rod 561 is secured a disc 568 which, when the rod 561 is moved upwardly, contacts and raises a plunger 569 to operate a limit switch 570 (Figure 5) in a switch box 570a.

Figure 5:
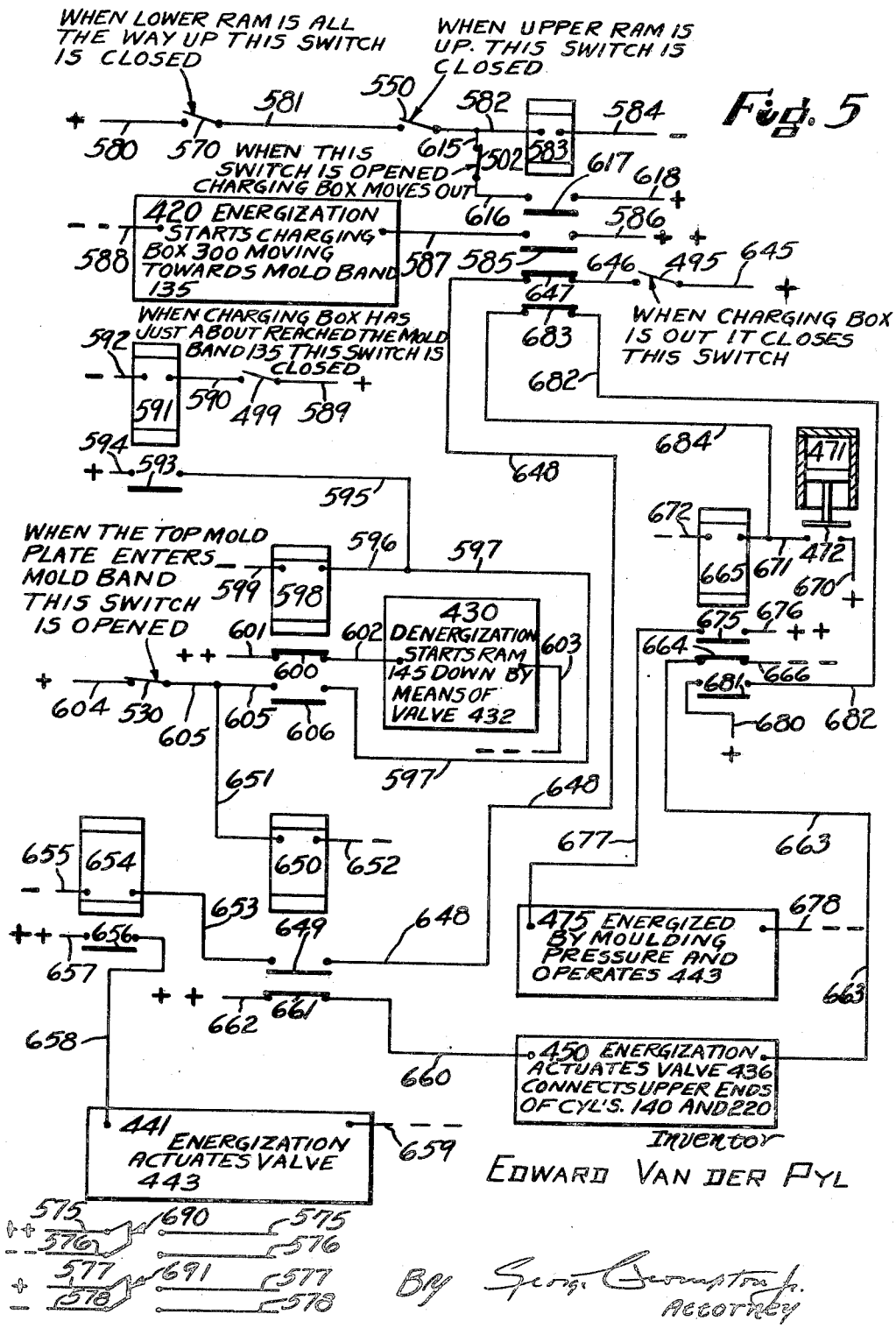

The manner in which the various switches whose actuation is above described control the solenoids which in turn control the valves (as heretofore described) to move the various elements of the molding press, automatically to make, from a suitable mixture of abrasive and bond, pressed "green" grinding wheels W is disclosed in the wiring diagram of Figure 5. I have found it desirable to use for electrical control two sources of electric current at different voltages, for example I may use 220 volts to actuate relays responsive to the closing of the limit switches and 440 volts to actuate the solenoids responsive to closing of the relay operated contacts. Alternating current, usually 60 cycles, is readily available everywhere, whereas direct current is not so widely available and consequently utilization of alternating current will be preferred in most factories. This can be single phase. All of the relays, solenoids and other devices indicated in Figure 5 can be operated by single phase, 60 cycle alternating current, using respectively 220 E. M. F. and 440 E. M. F., but the electrical mechanism hooked up as shown in the diagram can equally well be operated by direct current at two different voltages. In order to make the wiring diagram easier to understand by avoiding scores of instances of crossing wires, I indicate one side of the high voltage power line 575 by the symbol ++, the other side of the high voltage line 576 by the symbol — —, and one side of the low voltage line 577 by + and the other side of the low voltage line 578 by —.

Referring now to Figure 5, the switch 570 which is closed when the lower ram is up is connected by a wire 580 to the + line 577 and the other side of the switch 570 is connected by a wire 581 to the switch 550 which is closed when the upper ram is up and otherwise is open. The other side of the switch 550 is connected by a wire 582 to the coil of a relay 583, the other end of the coil being connected by a wire 584 to the — line 578. When the relay 583 is energized, it closes a switch 585. A wire 586 connects one side of the switch 585 to the ++ line 575 while another wire 587 connects the switcht 585 to the solenoid 420. The other side of the solenoid 420 is connected by a wire 588 to the — — line 576. This is the solenoid that sends the charging box 300 from its position under the gate 308 to its position above the mold band 135.

When the charging box 300 has nearly completed its movement "in," that is away from the gate 308, the limit switch 499 is closed, this being a normally open limit switch. The switch 499 is connected by a wire 589 to the + line 577. The other end of this switch 499 is connected by a wire 590 to the coil of a relay 591, the other end of which coil is connected by a wire 592 to the — line 578. The relay 591 upon being energized closes a switch 593 which is connected on one side by a wire 594 to the + line 577 and on the other side to a wire 595 which branches into wires 596 and 597. The wire 596 is connected to the coil of a relay 598 the other end of which coil is connected by a wire 599 to the — line 578. Thus, when the switch 593 is closed by the relay 591, the relay 598 is energized.

This action deenergizes the solenoid 430 which, as will be remembered, when energized holds the lower ram 145 up and therefore when deenergized allows it to move down. Deenergization of the solenoid 430 responsive to energization of the relay 598 takes place as follows: A normally closed switch 600 is opened by the relay 598 and this switch 600 has a wire 601 connecting it to the ++ line 575 and a wire 602 connecting it to the solenoid 430 the other end of which is connected by a wire 603 to the —— line 576.

The lower ram 145 having thus gone down remains down even though the charging box 300 returns to its position under the gate 308 thus opening the switch 499 and deenergizing the relay 591. To this end I provide a holding circuit for the relay 598 as follows: Starting with a wire 604 connecting one side of the switch 530 to the + line 577, then to a wire 605 to a switch 606 which is closed by energization of the relay 598, then from the switch 606 by a wire 597 to the wire 598 to the relay 598 to the wire 599 to the — line 578. Since the switch 530 is a normally closed switch, the holding circuit is made and the relay 598 remains energized. This switch 530 is actuated when the mold top plate 235 is approximately entering the mold band 135, but until that time the solenoid 430 remains deenergized.

Still referring to Figure 5, the switch 502 is a normally closed switch and when the dog 492 moves the roller 500 this switch is opened. This switch 502 is connected by a wire 615 to the wire 582 on one side and it is connected by a wire 616 to a normally open relay switch 617 operated by the relay 583. The other side of the relay switch 617 is connected by a wire 618 to the + line 577. Thus, even after the lower ram 145 has started down responsive to closing of the switch 499 and resulting in opening of the switch 570, the relay 583 is still kept energized by means of the holding circuit through the relay switch 617 and the normally closed switch 502, but when the latter is opened by action of the dog 492 on the roller 500, the circuit is broken and the relay 583 goes dead and this of course deenergizes the solenoid 420 by opening the relay switch 585 which starts the charging box 300 moving outwardly again and even though, as the result of the withdrawal of the dog 492 from the roller 500, the switch 502 closes again, the circuit is not remade because it includes the relay switch 617 which opened the moment the relay 583 went dead. This relay 583 will not be reenergized until both rams are up again thus closing both of the switches 550 and 570.

When the charging box 300 has moved all the way out, the switch 495, which is a normally open switch, is closed. Closing of the switch 495 results in energization of the solenoid 441 which starts the upper ram 226 downward under low pressure. This takes place as follows: The switch 495 is connected by a wire 645 to the + line 577. The switch 495 is likewise connected by a wire 646 to a normally closed switch 647 operable by the relay 583. The switch 647 is connected by a wire 648 to a normally open switch 649 which is, however, at this moment closed because it is controlled by a relay 650 which is connected by a wire 651 to the wire 605 on one side and by a wire 652 to the — line 578 on the other side. Current from the + line 577 can therefore flow through wire 648 and switch 649 to a wire 653 to a relay 654 and thence by a wire 655 to the — line 578. This energizes the relay 654 which closes a normally open switch 656 which connects a wire 657 from the ++ line 575 to a wire 658 to the solenoid 441 the other end of which is connected by a wire 659 to the —— line 576. Thus, the solenoid 441 is energized and the upper ram 226 descends.

As heretofore explained, when the mold top plate 235 carried by the ram 226 is about to enter the mold band 135, the switch 530, a normally closed switch, is opened. The exact moment is adjustable by adjusting the position of the dog 523 on the threaded end 518. At the moment or position of parts desired the flat ring 525 carried by the upper ram head 227 strikes the dog 523, the bolt 516 is moved downwardly thus moving downward the shaft 515 having the shoulder 527 which action opens the switch 530. This action deenergizes the solenoid 441, reenergizes the solenoid 430 and energizes the solenoid 450. It has hitherto been explained how the solenoids under these conditions direct fluid under low pressure to raise the ram 145 and to continue the downward movement of the ram 226 at the same rate as the upward movement of the ram 145. The action takes place as follows: The current can no longer flow through the wire 651 since the switch 530 is open. So the relay 650 is deenergized and this causes the switch 649 to open which cuts off current to the relay 654 which opens the switch 656 which deenergizes the solenoid 441. So also by the opening of the switch 530 current can no longer flow through the switch 606 so the holding circuit for the relay 598 is broken and the switch 600 closes thus energizing the solenoid 430. The solenoid 450 is connected by a wire 660 to a normally closed switch 661 operated by the relay 650 so now the switch 661 is closed. The other side of the switch 661 is connected by a wire 662 to the ++ line 575. The other side of the solenoid 450 is connected by a wire 663 to a normally closed switch 664 operated by a relay 665. The other side of the switch 664 is connected by a wire 666 to the —— line 576. The relay 665 is at this moment deenergized so the circuit is complete through the solenoid 450 and it is actuated.

It has already been explained how, when back pressure is exerted by the material being molded upon the pressure fluid, the high pressure is automatically exerted to compress the material in the mold to the desired density. Ultimately, when the posts 258 contact the upper ram head 227, the pressure in the pipes including the pipe 470 rises to operate the piston-cylinder unit 471 to close the switch 472. This switch 472 is connected by a wire 670 to the + line 577 and by a wire 671 to the relay 665. So prior to actuation of the switch 472, the relay 665 is dead thus leaving the switch 664 closed. But when the molding operation is completed and the switch 472 has closed, current flows from the + line 577 through wire 670 switch 472 wire 671 to the relay 655 and by a wire 672 to the — line 578 thus energizing the relay 665 which opens the switch 664 which deenergizes the solenoid 450. Energization of the relay 665 closes a normally open switch 675 connected by a wire 676 to the ++ line 575 and by a wire 677 to the solenoid 475 which is connected by a wire 678 to the —— line 576. Thus when the grinding wheel W is fully pressed, the switch 472 closes energizing the solenoid 475 and deenergizing the solenoid 450. This causes, as heretofore explained, both rams to rise. The switch 472 automatically opens but this does not deenergize the relay 665 since this relay is provided with a holding circuit. A wire 680 from the + line 577 is connected to a holding switch 681 closed by the relay 665 and the switch 681 is connected by a wire 682 which leads to a switch 683 operated by the relay 583. The switch 683 is a normally closed switch, that is when the relay 583 is deenergized. The switch 683 is connected by a wire 684 to the wire 671 which is connected to the relay 665, so once the relay 665 is energized it remains energized so long as the switch 683 is closed. When, however, both rams are up, the switches 570 and 550 are closed and this energizes the relay 583 which opens the switch 683 which deenergizes the solenoid 475 but cannot at this time reenergize solenoid 450 because the switch 530 is closed.

The cycle of operation now repeats thus turning out another pressed "green" grinding wheel W. The cycle of operation continues to repeat to produce more wheels so long as the hopper 301 contains material and so long as the press is supplied with fluid under pressure and the power lines 575, 576, 577 and 578 are energized. I provide a double pole hand switch 690 across the lines 575 and 576 for energizing and deenergizing at will all the circuits deriving power therefrom. Similarly I provide a double pole hand switch 691 across the lines 577 and 578 to energize and deenergize at will all the circuits supplied with power from those lines.

Referring now to Figures 3 and 13, a limit switch 695 is connected by a wire 696 to the + line 577 and this limit switch 695 is connected by a wire 697 to a relay 698 the other end of which is connected by a wire 699 to the — line 578. A switch 700 operated by the relay 698 is connected by a wire 701 to the ++ line 575 and by a wire 702 to a solenoid 703 which is connected by a wire 704 to the —— line 576. This solenoid 703, when energized, holds the valve piston 360 to the left in the position shown in Figure 3. With the parts in the position shown in Figure 3, the gate 308 is open. But, when the arm 402 moves away from the limit switch 695, this switch opens, and consequently the relay 698 goes dead and the solenoid 703 is deenergized, so the spring 365 moves the valve piston 360 to the right and the air pressure moves the piston 350 to the right, Figure 3, which swings the hopper gate 308 to the closed position. Thus it will be seen that as soon as the charging box 300 has barely started to move, the hopper gate 308 will be closed but, whenever the charging box returns to its final position of rest under the hopper 301, the hopper gate 308 is opened. Although closed when the valve 360 is in the position shown, the switches 695 and 700 are normally open so are shown that way.

The construction of the various valves whose positions in the hydraulic circuits are indicated in Figure 4 and whose functions has been hereinbefore described are illustrated in Figures 20 to 27 inclusive. These valves are commercial valves, available on the market, and are not per se the subject of my invention. For that reason and also because the drawings, Figures 20 to 27, are quite detailed and readily understood by one skilled in this art, I shall make my description of these valves reasonably brief.

Figure 20 illustrates the solenoid 420 and the valve 421. A solenoid core member, not shown, is connected to operate a valve stem 740 having pistons 741 and 742. The low pressure line 422 is connected to a port 745 while the pipe 423 is connected to a port 747. A channel 748 is connected to an exhaust pipe 749 and to a port 750 (the valve has other ports but they are not used). A spring 755 extending between the stem 740 and a cover 756 on the end of the valve casing normally holds the stem 740 and the pistons 741 and 742 to the right as indicated. In this position the port 747 is connected to the port 750 and so therefore the pipe 423 is connected to the exhaust pipe 749. At this time the line 422 is connected to nothing by way of this valve. When, however, the solenoid 420 is energized, the valve stem 740 is shifted to the left and this connects ports 745 and 747 together while disconnecting the exhaust port 750 from the port 747.

Figure 23 illustrates the valve 458. A valve stem 760 has pistons 761 and 762 which are located in a cylinder bore 763 of the valve casing, said cylinder bore 763 having ports 765 and 766. The stem 760 with the pistons 761 and 762 are normally upheld by a spring 767 between the piston 762 and a cap 770. The pipe 457 is connected to a bore 771 in a cap 772 which covers the end of the cylinder bore 763. Normally the piston 762 blocks the port 766 which is connected to the pipe 459. But when pressure is exerted in the cylinder bore 763 from the pipe 457 against the end of the piston 761, the latter and the piston 762 are shifted downwardly to connect the ports 765 and 766, the former being connected to the pipe 460. Thus at that time the pipes 459 and 460 are connected as previously described. When the pressure from the pipe 457 is released, the connection between pipes 459 and 460 is broken. In the cap 770 is a bore 773 connected to a drain pipe 774. This is for the purpose of discharging oil that may leak by the piston 762 into the sump. This pipe 774 is connected to the sump or oil supply tank, not shown, as are all drain pipes hereinafter mentioned.

Figure 24 illustrates the piston-cylinder unit 471 and the switch 472 in the switch box 472a. This construction comprises a valve casing 780 and piston-cylinder casing 781 and the switch box 472a, all connected together as shown. The pipe 470 is connected to a bore 782 through which is a cross bore 783 leading to a bore 784 parallel to the bore 782. The cross bore 783 merges into an enlarged threaded counterbore 785 which is plugged with a screw threaded plug 786. The cross bore 783 further has a counterbore 787 in which is located a sleeve 788 providing a seat for a ball 789 held in closed position by a spring 790 on a pin 791 projecting from the plug 786.

The bore 782 is further intercepted by a bore 792 which merges into a larger bore 793 containing a bored plug 794 having a seat for a ball 795 held in position by a spring 796 on a pin 797 which is on the end of a spindle 798 having a threaded portion 799 in a nut 800 screwed into the casing 780. The larger bore 793 is connected to the bore 784. Adjustment nuts 801 are provided on the threaded portion 799 outside the casing.

The foregoing constitutes two check valves in parallel and opening in opposite directions. However, the ball 795 will not move away from its seat until the pressure rises to the extremely high figure already referred to, the pressure required to move the ball 195 being adjustable by adjusting the spindle 798. On the other hand, for the purpose of exhausting fluid back into the pipe 470, the ball 789 will move away from its seat under very light pressure.

In the casing 781 is a cylinder bore 805 containing a piston 806. The cylinder bore 805 is connected to a chamber 807 which is connected to the bore 784. A spring 808 normally keeps the piston 806 in the upper position as shown, this spring 808 being mounted on a switch rod 809 and extending between the outside of the box 472a and the piston 806. In the box 472a is the switch 472 on the end of the rod 809. This is a normally open switch but when the fluid passing by the ball 795 enters the chamber 807 and moves the piston 806 downwardly, the rod 809 closes the switch 472 against terminals 810 and 811 respectively connected to the wires 670 and 671. A drain pipe 812 is connected to a bore 813 extending into the cylinder 805.

Figure 25 illustrates the valve 432 and shows this valve in the actuated position connecting the pipes 433 and 462. A valve stem 820 has pistons 821, 822 and 823. The pipe 433 is connected to a port 824 while the pipe 462 is connected to a port 825 and as indicated when the valve stem 820 and the pistons 821, 822 and 823 are actuated to the right, the ports 824 and 825 are connected. The exhaust pipe 434 is connected to a channel 826 which is connected to a port 827. When the parts 820, 821, 822 and 823 are shifted to the left by a spring 828 in the valve cap 829 which spring engages the piston 823, the piston 822 closes the port 825 and connects the port 824 to the port 827.

It will be remembered that the valve 432 is operated by a pilot valve 431 which in turn is operated by a solenoid 430. Neither in this case nor in any other case is the solenoid illustrated in detail since all of such solenoids are or may be purely conventional and the construction thereof is well known. The core of the solenoid 430 is connected to a valve stem 830 of the pilot valve 431 and it is noted that actuation of the solenoid 430 moves the valve stem 830 downwardly and Figure 25 shows valve stem 830 having been moved downwardly. The valve stem 830 has pistons 831 and 832. A port 833 is connected to the pipe 466 while a port 834 is connected to a bore 835. These two ports 833 and 834 are connected when the pilot valve is actuated as shown. Thereby fluid is admitted to the bore 835 which is intersected by a bore 836. In an enlarged portion of the bore 836 is a spring actuated ball check valve 837 connecting the bore 836 to a passage 838 leading to the cylinder 839 in which the pistons 821, 822 and 823 are located. An adjustable needle valve 840 is likewise located in the bore 836 and connects it to a transverse bore 841 also leading into the cylinder 839.

When the parts 830, 831 and 832 are in the actuated position shown in Figure 25, fluid readily passes from the pipe 466 via the port 833, port 834, bore 835, bore 836, valve 837, passage 838 into the cylinder 839 to act upon the valve piston 821 to move it and the other parts to the right as shown thus connecting the pipes 433 and 462. When, however, the solenoid 430 is deenergized, a spring 845 moves the pistons 831 and 832 upwardly, connecting the bore 835 via port 834 to a port 846 which is connected to a drain pipe 848. At the same time the piston 832 blocks the port 833. Fluid can drain from the cylinder 839 through the transverse bore 841 and pass the needle valve 840 into the bore 836 and thence into the bore 835 into the port 834 and the port 846 and out the drain pipe 848, but this draining is controlled by the needle valve 840 whereby to prevent shock to the valve 432 and the system in general.

Figure 26 illustrates the valve 436 which is operated by the pilot valve 451 which is in turn operated by the solenoid 450. The valve 436 is identical with the valve 432 so the valve 436 need not be specifically described, but it is noted that the valve stem 820 and the pistons 821 and 822 and 823 are shown in the left hand or normal position in Figure 26. The same characters of reference are used in Figure 26 for the valve parts as were used in Figure 25 but it is noted that the port 824 is connected to the pipe 435 and the port 825 is connected to the pipe 452 while the passage 826 is connected to the pipe 437.

The pilot valve 451 has all the parts, ports and functions of the pilot valve 431 so again the same reference characters are used and the description need not be repeated. However, a bore 860 is drilled into the port 834 and this bore 860 is connected to the pipe 457. This is a feature not supplied nor contemplated by the valve manufacturer. The port 833 is connected to the pipe 456 while the port 846 is connected to a drain pipe 861. The pilot valve 451 functions, with respect to the valve 436 exactly as the pilot valve 431 functions with respect to the valve 432. However, the pilot valve 451 is also a main solenoid operated valve with respect to the pipes 456 and 457 for when the solenoid 450 is actuated these pipes are connected for direct flow of fluid.

Figure 27 illustrates the main valve 443, the pilot valve 442 operated by the solenoid 441 and the pilot valve 476 operated by the solenoid 475. Each of the pilot valves 442 and 476 is arranged to operate the main valve 443, the pilot valve 442 operating said main valve in one direction and the pilot valve 476 operating said main valve in the other direction. To hold the main valve 443 in the neutral position, a spring centering mechanism is provided which will be presently described.

The pilot valves 442 and 476 are identical with the pilot valve 431 so the same reference characters have been used and the detailed description need not be repeated. In the case of the pilot valve 442, the port 846 is connected to a drain pipe 862 while in the case of the pilot valve 476, the port 846 is connected to a drain pipe 863.

The main valve 443 is itself substantially identical with the main valves 432 and 436. Accordingly, again the same reference characters have been used and the description will not be repeated. It will be seen that the port 824 is connected to the pipe 446, the port 825 is connected to the pipe 444, and the channel 826 is connected to the pipe 478 which is an exhaust pipe leading to the sump. However, in Figure 27 the pistons are marked 821a, 822a and 823a because they are different from the pistons 821, 822 and 823 of Figures 25 and 26 in length and locus and the piston 823a has extending from it a long stem 870. Referring now to Figure 27, the transverse bore 841 and the passage 838 of the pilot valve 476 empty into a cylinder bore 871 which merges into a larger bore 872 both located in a connecting member 873 connecting the casing of the pilot valve 476 with the casing of the valve 443. The bore 872 is continuous with a bore 874 in the casing of the valve 443 and as will be seen, the long stem 870 is mostly located in this bore 872—874.

Located on the long stem 870 are slotted discs with hubs 875 and 876 and extending between them are springs 877 and 878. The disc 876 is held against the springs 877 and 878 by means of a pin 879. When the valve 443 is in the mid position as shown, the disc 876 is against the right hand end of the bore 872 while the disc 875 is against the left hand end of the bore 874. Because the discs 875 and 876 are slotted, pressure fluid from the pilot valve 476 can readily reach the end of the piston 823a to move it and the parts integral with it to the left. Without further description it will readily be seen that when both solenoids 441 and 475 are deenergized, the pistons 821a, 822a and 823a are in the central position shown in Figure 27 in which position all three of the pipes 444, 446 and 478 are blocked. When only the solenoid 441 is energized these three pistons are moved to the right, and when only the solenoid 475 is energized, these pistons are moved to the left. When only the solenoid 441 is energized, the port 827 is blocked which blocks the pipe 478 and at the same time the ports 824 and 825 are connected which connects the pipes 446 and 444. When only the solenoid 475 is energized, the port 825 is blocked which blocks the pipe 444 and at the same time the ports 824 and 827 are connected which connects the pipes 446 and 478.

Figure 2:
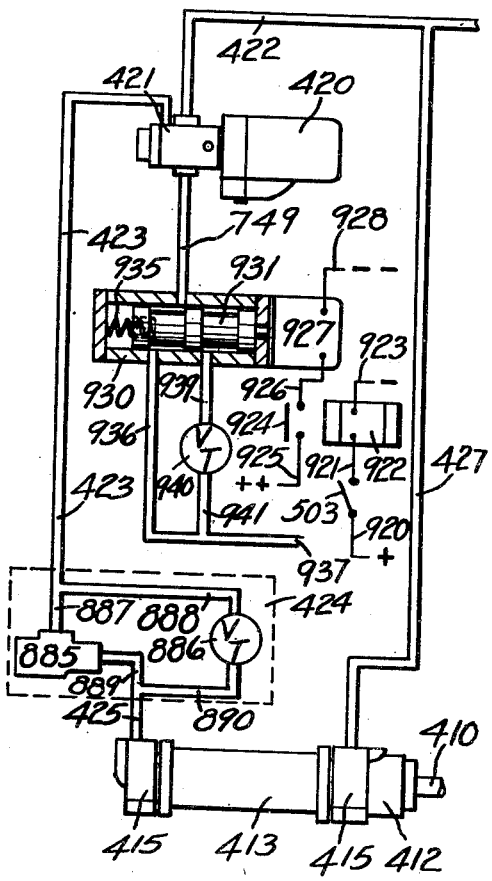

Referring now to Figures 2 and 21, the valve mechanism 424 consists of a check valve 885 and a throttle valve 886 connected together as shown in Figure 2. The pipe 423 branches into a pipe 887 leading to the check valve 885 and into a pipe 888 leading to the throttle valve 886. The check valve 885 is connected by a pipe 889 to the pipe 425, while the throttle valve 886 is connected by a pipe 890 to the pipe 425. The check valve 885 allows fluid to flow through it away from the cylinder 413 but not towards it. Thus the charging box 300 moves towards the mold band 135 under the control of the throttle valve 886 but the charging box 300 moves away from the mold band under other controls as will presently be explained.

The throttle valve 886 is illustrated in Figure 22 and the throttle valve 461 as well as the needle valve 449 may be of the same construction. Such throttle valves or needle valves have chambers 900 and 901 each connected to piping and separated by a wall 902 having an orifice 903 adapted to be restricted by a conical plug 904 on the end of a spindle 905 having threads 906 and a wheel 907 by the turning of which the valve can be adjusted.

The check valve 885 is illustrated in Figure 21 and the check valve 464 may have the same construction. A channel 910 is connected to piping and a channel 911 at right angles to the channel 910 is likewise connected to piping. A plug 912 is pressed by a spring 913 against a seat 914 at the end of the channel 910. Without further description it will be evident that fluid can flow from the channel 910 to the channel 911 but not vice versa.

Referring again to Figure 2, the switch 503 which is in the switch box 503a illustrated in Figure 6 and which is closed when the dog 491 is riding on the roller 505, is connected by a wire 920 to the + line 577 and the other end of the switch 503 is connected by a wire 921 to a relay 922 which is connected by a wire 923 to the — line 578. When, during the movement of the charging box 300 in or out, the dog 491 is riding on the roller 505, this relay 922 is therefore energized. This relay 922 operates a switch 924 which is connected by a wire 925 to the ++ line 575. The other side of the switch 924 is connected by a wire 926 to a solenoid 927 the other end of which is connected by a wire 928 to the —— line 576. Accordingly, whenever the relay 922 is energized, the solenoid 927 becomes energized and conversely deenergization of the relay 922 results in deenergization of the solenoid 927.

The solenoid 927 operates a valve 930 having a valve stem 931 with three pistons as shown in Figure 2. A spring 935 keeps the valve stem 931 to the right when the solenoid 927 is deenergized. At that time the exhaust pipe 749 is connected to a pipe 936 which is connected to an exhaust pipe 937 and consequently when the charging box 300 is moving outwardly it is controlled by no valve provided the solenoid 927 is deenergized. But when the dog 491 is riding on the roller 505 the solenoid 927 is energized, which connects the pipe 749 to a pipe 939 which is connected to a valve 940 which is connected by means of a pipe 941 to the exhaust pipe 937 and hence, if the charging box 300 is moving outwardly, it is controlled by the valve 940 which may be of the construction shown in Figure 22.

Referring now to Figures 13, 14 and 15, an angle iron 950 is welded to the rear slanting wall 951 of the charging box 300 on the outside thereof. This angle iron 950 is detachably secured to an angle iron 952 as by means of a plurality of sets of screws and nuts 953. The angle iron 952 is welded to an angle iron 954 the vertical portion of which is seen in Figure 14, while most thereof which is visible in Figure 13 is the horizontal portion which has a long slot 955.

Secured to the arm 377 as by means of screws 956 is an horizontal plate 957. The angle iron 954 is removably and adjustably secured to the plate 957 by means of screws 958 extending through the slot 955 and into the plate 957. Thus the charging box is secured to the arm 377 and is adjustable in the direction of its movement in and out relative to the arm 377.

Referring now to Figures 14 and 15, I may provide adjustable sliders or contactors 960 and 961, the former at the front and rear of the box and the latter at the sides of the box. However it must be clearly understood that these sliders 960 and 961 are optional features and in the smaller sizes of presses the mechanism hereof has operated very well without any such sliders or contactors. The sliders 960 that I have used have medium hard rubber contacting strips 962 riding on the wear plate 389 (made of steel) while the sliders 961 that I have used have fibre contacting strips 963 riding on the wear plate 389. These sliders with their wear strips have given excellent results in actual practice.

The sliders 960 and 961 are adjustably attached to the bottom of the charging box 300. As shown, supporting plates 965 are welded to the narrow sides of the charging box 300, and between them extend front and back supporting plates 966 welded to the edges of the plates 965 in cut-out portions thereof as indicated in Figure 14. Threaded studs 967 are secured to and extend from the supporting plates 965 and 966 and through vertical slots in the sliders 960 and 961 and thus the sliders can be adjusted vertically and then secured in position by nuts 969 on the studs 967. For further convenience in leveling this mechanism and for ensuring a continuous contact between the wear plate 389 and the contacting strips 962 and 963, I provide leveling bolts 970 extending through shelves 971 extending from the supporting plates 965 which can be made to contact the sliders 960 and can be used to raise and lower the charging box 300 relative to the wear plate 389 so that the former will bear upon the latter with just enough pressure and never too much in order to keep the mix from escaping except into the mold and in order to avoid excessive wear on the wear plate 389. It has been found that, in the manufacture of certain white vitrified grinding wheels, a charging box having a metal bottom suffers enough attrition of metal some of which is delivered into the mold that the vitrified wheels are discolored which makes them second grade in commerce, but by using rubber and fibre contacting strips this undesired occurrence is avoided. Accordingly, for the manufacture of white vitrified grinding wheels I recommend non-metallic contacting strips on the bottom of the charging box regardless of whether the adjustments above described are provided or not. Nuts 972 on the bolts 971 can be used to lock them in place to assist in supporting the box 300.

In shape the charging box 300 may be said to be a hollow right prism with an open top and open bottom continued downwardly by a hollow right prism with an open top and bottom, the rear face of the lower prism being continuous with the rear face of the upper prism and the front faces of the prisms forming an obtuse dihedral angle. This results in an open bottom which is rectangular and the ratio of the length to the width of the rectangle is large. It also results in a forward slant to the bottom of the charging box so that, when the box is away "in" and is reversed, inertia assists gravity in delivering the mix into the mold. The length of the rectangular opening in the bottom of the box is greater than the diameter of the mold band 135 so that the mold can be filled level. I have found that a charging box of this shape well fills a mold when the box 300 and bottom plate 170 move relatively to each other in any of the ways hereinafter explained, but some of the features of the box are more a matter of convenience than a functional necessity, for example the bottom opening does not have to be a rectangle, it could be a figure bounded by a pair of concentric sectors of generous radius, but such a box would be more difficult to manufacture.

Referring now to Figures 13 and 19, extending from the side of the table 120 is an extension 975 which supports a post 976 on which is clamped a horizontal arm 977 having a split end through which extends a clamping screw 978 tightened by a hand wheel 979. It is clear that the horizontal arm 977 can be raised and lowered and also angularly adjusted on the post 976. The tube 303 is integral with the arm 977 and thus the hopper 301 is supported.

The hopper 301 may have any funnel shape but actually it was an inverted four-sided truncated pyramid. As shown in Figure 13, the cylinder 348 is attached to the arm 977 by means of bolts 980.

As shown in Figure 19, above the hopper 301 is a feeding chute 983 having an adjustable extension 984. This chute 983 is supported by a bracket 985 secured to the cap 114. A feeding hopper 987 which can have any convenient shape is removably secured by metal straps 988 having hook portions 989 in the top thereof by means of which the hopper 987 can be hung on a rod 990 supported overhead in any suitable manner. This hopper 987 is one of many of the same kind so that as fast as one gets empty a full one can be substituted therefor. A combination spout member and closure 991 is hinged to the hopper 987 by pins 992 to open and close the hopper 987. As shown in Figure 19, the spout and closure member 991 is in open position, but when it is swung away from the plane of the drawing a portion with no orifice covers the opening in the bottom of the hopper. Details such as these may be varied at will, the arrangement shown providing a considerable quantity of mix in the "pipe line" with provisions for bringing in new supplies of mix as desired.

Referring now to Figures 16, 17 and 18, the apparatus of this invention is versatile and it is possible to cause the mold filling operation to operate in several different ways. In this connection a sequence of motions in a certain relative order may give excellent results for the manufacture of grinding wheel out of a certain dry granular mix having a particular angle of repose. Furthermore there are many grit sizes of abrasive and proportions of bond to abrasive and also the abrasive may be silicon carbide or aluminum oxide and there are several varieties of the latter. The shape of the granules vary widely and is significant. Furthermore the bond may vary between resinoid bond on the one hand and vitrified bond on the other hand and there are dozens of varieties of each. Therefore my invention, in providing a mechanism which can be changed, not only to adjust the exact time of the occurrence of a particular action but also to change the order of occurrences of events, presents decided advantages. Furthermore the provision of a long, generally rectangular, opening to the charging box, the length of the rectangle being substantially radial to the arc of movement thereof together with the slow movement of the charging box over the mold cavity, appears to present outstanding advantages in mold filling as proved by actual experience. In this connection the retreating edge of the charging box, as represented herein by the front contacting strip 962 and its slider 960 constitutes a leveling device for leaving the mold filled level without any depressions or elevations therein.

Figure 7:
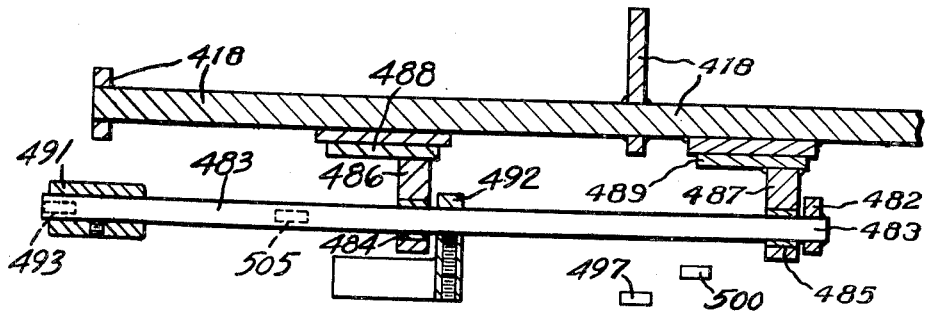
Figure 8:
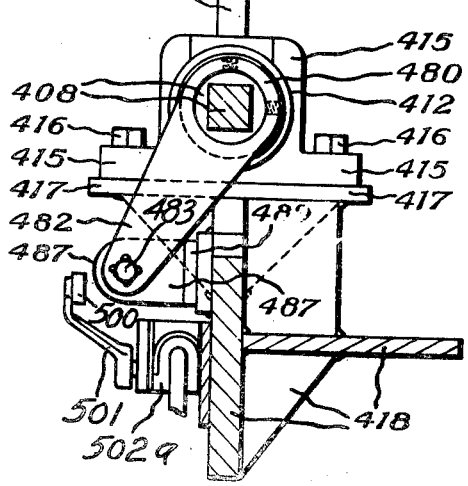

Referring now to the above mentioned Figures 16, 17 and 18 and also referring to Figures 6, 7 and 8, the box 499a can be positioned relative to the box 502a so that the dog 492 hits the roller 497 well in advance of hitting the roller 500. The first action causes the lower mold plate 170 to start to descend. In Figure 16 this plate started to descend just as the charging box 300 came to the arbor 172. The charging box 300 went a little beyond the mold and was then reversed and before it had reached any portion of the mold band 135 on the return trip the plate 170 was all the way down. As it retreated slowly over the mold cavity the mold was well filled and leveled. The valve 940 was so adjusted that the charging box 300 went slowly enough thoroughly to fill all parts of the mold. It may be said that the orifice of the charging box, as it moves across the mold, intersects the circle of the mold band 135 in an infinite number of narrow areas which collectively cover the entire area of the mold band and furthermore overlap each other. In this way the entire area of the mold band is covered and there is a charge of dry granular mix with a good pressure head behind it ready to fall into the cavity exposed and to fill all parts thereof equally. The particular advantage, especially with sticky mixes, of causing the lower mold plate 170 to start down before the charging box has passed over the mold band 135 on the inward stroke lies in filling the far bottom corner of the mold which is sometimes not fully filled when filling starts only on the return stroke.

It will be observed from comparison of Figures 6 and 7 and also Figure 13 that the roller and arm 500, 501 can be received behind the roller and arm 497, 498. Thus the two rollers 497 and 500 can be placed in line so that the dog 492, which as shown in Figures 7 and 13 is a wide dog, will depress them simultaneously. The mechanism for moving the charging box 300 can be adjusted, as by means of the screws 958, so that the box 300 will go well beyond the mold band 135 perhaps to a little beyond the position shown in Figure 18 and then the valve 940 can be so set as to give the charging box 300 a slow return as long as the dog 491 is on the roller 505 (it is contemplated that dogs of different lengths will be provided for the machine) and then by the time the charging box 300 starts filling the mold the mold plate 170 will be at its bottom position. This system works very well for certain dry granular mixes.

However, many other variations in the settings of the dogs, switch boxes, valves and other adjustments can be made, those mentioned being merely illustrative. Presses equipped with the molding mechanism of this invention have now been found to be capable of handling widely different dry granular mixes with resultant manufacture of the best quality grinding wheels in quantities. In this connection modern industry demands well balanced grinding wheels and grinding wheels of good balance do not result unless the mold is filled to the same density all over. In the molding of grinding wheels by hand this was done by rotating the mold and distributing the mix with a straight edge. By means of the controls and charging box features herein described I am enabled to produce perfectly balanced grinding wheels and the versatility of the apparatus will be apparent when it is pointed out that the adjustments are changed for the manufacture of wheels of different diameters and thicknesses or out of different mixes. It is further apparent that the apparatus of this invention does not imitate the procedure of filling molds by hand.

The "fluid" used in the system illustrated in Figure 4 should be a liquid since the movement of the various parts and elements operated by this system should be smooth, positive and controlled. Oil of one kind or another is almost universally used for so-called "hydraulic" mechanism today. Naturally, therefore, in putting my invention into use I have used oil.

It will thus be seen that there has been provided by this invention apparatus in which the various objects hereinabove set forth together with many practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. Molding apparatus comprising a lower ram, a bottom mold plate secured to said lower ram, an upper ram coaxial with said lower ram, a top mold plate secured to said upper ram, a mold table between said rams, a mold band secured in said table and of a size and so positioned that it will receive each of the bottom plate and the top plate, hydraulic mechanism to move said rams relative to said mold band, the bottom mold plate being movable from a high position to a low position in the mold band and back again to the high position and the top mold plate being movable from a position well above the mold band to a position well into the mold band and back again, a charging box having a bottom opening which spans the mold band but whose dimension in the direction of movement of the charging box is less than half of the diameter of the opening in the mold band to charge granular material into the mold band whereby the mold plates can press it into a molded shape, means for moving said charging box from a position remote from the mold band to the locus of the mold band and back again, whereby to take on a load of granular material deposit it in the mold band and return again for more material, and control mechanism actuated in timed relation to the movement of the charging box and comprising a control for starting the lower ram moving down from its upper position, and a control for returning the charging box, said controls being arranged so that the bottom mold plate is moving down while the bottom opening of the charging box is moving over the opening in the mold band on the stroke of the charging box from its position remote to the locus of the mold band, and said controls being further arranged so that the rear edge of the bottom opening of the charging box has moved more than half way across the opening in the mold band by the time the bottom mold plate has moved to its low position, and said controls being further arranged to cause the bottom mold plate to have reached its said low position in the mold band by the time the bottom opening of the charging box is over the opening in the mold band and moving back again to the position remote.

2. In apparatus as claimed in claim 1, the combination with the parts and features therein specified, of a further control for slowing the movement of the charging box and operable over an adjustable length of this movement adjacent the locus.

3. In apparatus as claimed in claim 2, the combination with the parts and features therein specified, of the further feature that the lower portion of the charging box has a forward slant towards the locus of the mold band.

4. In apparatus as claimed in claim 1, the combination with the parts and features therein specified, of the further feature that the lower portion of the charging box has a forward slant toward the locus of the mold band.

5. In apparatus as claimed in claim 4, the combination with the parts and features therein specified, of the further feature that the charging box is a hollow right prism with an open top and open bottom continued downwardly by a hollow right prism with an open top and bottom, the rear face of the lower prism being continuous with the rear face of the upper prism and the front faces of the prisms forming an obtuse dihedral angle.

6. In apparatus as claimed in claim 5, the combination with the parts and features therein specified, of a further control for slowing the movement of the charging box and operable over an adjustable length of this movement adjacent the locus.

7. In apparatus as claimed in claim 1, the combination with the parts and features therein specified, of the further feature that the charging box is a hollow right prism with an open top and open bottom continued downwardly by a hollow right prism with an open top and bottom, the rear face of the lower prism being continuous with the rear face of the upper prism and the front faces of the prisms forming an obtuse dihedral angle.

8. In apparatus as claimed in claim 7, the combination with the parts and features therein specified, of further control for slowing the movement of the charging box and operable over an adjustable length of this movement adjacent the locus.

References Cited in the file of this patent

UNITED STATES PATENTS

| Number | Name | Date |
|---|---|---|
| 861,903 | Rosell | July 30, 1907 |
| 1,742,670 | Schmidt | Jan. 7, 1930 |
| 1,905,975 | Thomas | Apr. 25, 1933 |
| 2,219,048 | Magnenat | Oct. 22, 1940 |
| 2,232,180 | Kux | Feb. 18, 1941 |
| 2,320,728 | Hume | June 1, 1943 |
| 2,389,169 | Stacy | Nov. 20, 1945 |
| 2,389,319 | McMordie et al. | Nov. 20, 1945 |
| 2,437,109 | Maquat | Mar. 2, 1948 |
| 2,523,137 | Nichols et al. | Sept. 19, 1950 |
| 2,541,899 | Wellman | Feb. 13, 1951 |
| 2,556,951 | Weidner | June 12, 1951 |

FOREIGN PATENTS

| Number | Country | Date |
|---|---|---|
| 100,231 | Germany | Dec. 10, 1898 |